US012666267B2

(12) United States Patent     (10) Patent No.:   US 12,666,267 B2

Balmakhtar et al.      (45) Date of Patent:    Jun. 23, 2026

(54) TRUST ARCHITECTURE FOR TELECOMMUNICATION NETWORK SLICE SECURITY

(71) Applicant: T-MOBILE INNOVATIONS LLC, Overland Park, KS (US)

(72) Inventors: Marouane Balmakhtar, Fairfax, VA (US); Lyle Walter Paczkowski, Mission Hills, KS (US); Galip Murat Karabulut, Vienna, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 348 days.

(21) Appl. No.: 18/468,360

(22) Filed: Sep. 15, 2023

(65) Prior Publication Data

US 2025/0097712 A1    Mar. 20, 2025

(51) Int. Cl.
*H04W 12/37*      (2021.01)
(52) U.S. Cl.
CPC ................................... *H04W 12/37* (2021.01)
(58) Field of Classification Search
CPC ............................... H04W 12/37; H04W 12/08
See application file for complete search history.

(56) References Cited

U.S. PATENT DOCUMENTS

| | | | | |
|---|---|---|---|---|
| 2014/0344318 A1* | 11/2014 | Vas | ......................... | G06F 16/13 |
| | | | | 707/827 |
| 2019/0205317 A1* | 7/2019 | Tobias | .................. | G06F 40/174 |

| | | | | |
|---|---|---|---|---|
| 2020/0029207 A1* | 1/2020 | Ni | ......................... | H04L 67/141 |
| 2020/0195495 A1* | 6/2020 | Parker | ..................... | H04L 41/40 |
| 2020/0260288 A1* | 8/2020 | Yang | ................... | H04L 41/5048 |
| 2022/0217540 A1* | 7/2022 | Choyi | ................... | H04W 28/24 |
| 2023/0080047 A1* | 3/2023 | Bashir | ................... | H04W 24/02 |
| | | | | 370/354 |
| 2023/0102604 A1* | 3/2023 | Lei | ..................... | H04W 12/106 |
| | | | | 455/410 |
| 2023/0179638 A1* | 6/2023 | Hu | ..................... | H04L 41/0895 |
| | | | | 726/1 |
| 2023/0269577 A1* | 8/2023 | Lei | ........................ | H04W 12/04 |
| | | | | 455/411 |

(Continued)

OTHER PUBLICATIONS

Olsson, J., et al., "5G zero trust", A Zero-Trust Architecture For Telecom, Ericsson Technology Review, p. 12 (May 12, 2021).

(Continued)

*Primary Examiner* — Santiago Garcia

(74) *Attorney, Agent, or Firm* — Shook, Hardy & Bacon L.L.P.

(57)          ABSTRACT

In various embodiments, systems and methods for a trust architecture for telecommunication network slice security are disclosed. In some embodiments a trust architecture for telecommunication network slice security distributes network security functionality to individual network entities that constitute elements of a network slice instance. Slice network functions each individually implement components of the trust architecture for the network slice using a policy enforcement point (PEP) and a policy decision point (PDP). Each slice network function thus validates the authenticity and authorized privileges associated with the subject entity seeking a service from that slice network function, and grants or denies such service requests based on a policy implemented by the PEP and PDP.

19 Claims, 8 Drawing Sheets

(56) References Cited

U.S. PATENT DOCUMENTS

| | | | | |
|---|---|---|---|---|
| 2023/0269589 | A1* | 8/2023 | Baskaran | H04W 12/037 |
| | | | | 726/6 |
| 2023/0275833 | A1* | 8/2023 | Hyun | H04L 47/00 |
| | | | | 370/389 |
| 2024/0313969 | A1* | 9/2024 | Kunz | H04W 12/48 |
| 2025/0039247 | A1* | 1/2025 | Hoffmann | H04L 65/1045 |
| 2026/0006434 | A1* | 1/2026 | Colom Ikuno | H04W 12/037 |

OTHER PUBLICATIONS

"5G Cybersecurity Guidance", CISCO, pp. 1-10 (2020).

Poretsky, S., "Evolving 5G Security for the Cloud", Ericsson, Retrieved from Internet URL : https://www.ericsson.com/en/blog/6/2022/evolving-5g-security-for-the-cloud, accessed on Aug. 7, 2023, pp. 1-9 (Jan. 14, 2022).

"Least privilege—Glossary", CSRC, Retrieved from Internet URL : http://csrc.nist.gov/glossary/term/least_privilege, pp. 2, accessed on Aug. 7, 2023.

Rose, S., et al., "Zero Trust Architecture", NIST Special Publication 800-207, pp. 1-59 (Aug. 2020).

"Policy decision point (PDP)—Glossary", CSRC, Retrieved from Internet URL : http://csrc.nist.gov/glossary/term/policy_decision_point, pp. 2, accessed on Aug. 7, 2023.

"Policy enforcement point (PEP)—Glossary", CSRC, Retrieved from Internet URL : http://csrc.nist.gov/glossary/term/policy_enforcement_point , pp. 2, accessed on Aug. 7, 2023.

"Security for 5G", A 5G Americas White Paper, pp. 1-39 (Dec. 2021).

Morgan, W., "What Does Zero Trust Mean for Kubernetes?", Retrieved from Internet URL : https://www.infoq.com/articles/zero-trust-k8s/, accessed on Aug. 7, 2023, pp. 1-9 (Aug. 25, 2022).

"What is a Zero Trust Architecture", Palo Alto Networks, Retrieved from Internet URL: https://www.paloaltonetworks.com/cyberpedia/what-is-a-zero-trust-architecture?utm_source=google-jg-amer-portfolio&utm_medium=paid_search&utm, pp. 5, accessed on Aug. 7, 2023.

"What is Zero Trust?", IBM, Retrieved from Internet URL: https//www.ibm.com/topics/zero-trust, pp. 8, accessed on Aug. 7, 2023.

Borkar, A., et., "When Implementing Zero Trust, Context Is Everything", Security Intelligence, Retrieved from Internet URL: https://securityintelligence.com/posts/when-implementing-zero-trust-context-is-everything/, accessed on Aug. 7, 2023, pp. 1-10 (May 14, 2020).

Smeets, B., and Teppo, P., "Why Enterprise Zero Trust Architecture matches 5g security", Ericsson, Retrieved from Internet URL: https://www.ericsson.com/en/blog/2022/2/zero-trust-architecture-enterprise-5g-security, accessed on Aug. 7, 2023, pp. 1-9 (Feb. 8, 2022).

* cited by examiner

ESTABLISH A NETWORK SLICE INSTANCE ON A
TELECOMMUNICATIONS NETWORK, THE NETWORK SLICE
INSTANCE COMPRISING AT LEAST A PLURALITY OF SLICE
NETWORK FUNCTIONS CORRESPONDING TO NETWORK
FUNCTIONS OF AN OPERATOR CORE NETWORK OF THE
TELECOMMUNICATIONS NETWORK
B610

600

ESTABLISH A TRUST ARCHITECTURE FOR THE NETWORK
SLICE INSTANCE BASED ON A SLICE SECURITY POLICY
DEFINED BY A SLICE TRUST MANAGER, WHEREIN THE SLICE
TRUST MANAGER DEFINES A PLURALITY OF SLICE
PROTECTION POINTS, EACH SLICE PROTECTION POINT
CORRESPONDING TO A SLICE NETWORK FUNCTION OF THE
PLURALITY OF SLICE NETWORK FUNCTIONS WITHIN THE
NETWORK SLICE INSTANCE
B612

EXECUTE A LOCAL POLICY DECISION POINT AND A LOCAL
POLICY EXECUTION POINT AT EACH SLICE NETWORK
FUNCTION CORRESPONDING TO A RESPECTIVE SLICE
PROTECTION POINT OF THE PLURALITY OF SLICE PROTECTION
POINTS
B614

FOR AT LEAST A FIRST SLICE NETWORK FUNCTION OF THE
PLURALITY OF SLICE NETWORK FUNCTIONS, APPLY THE
LOCAL POLICY EXECUTION POINT TO REGULATE SERVICE
REQUESTS BASED ON A LOCAL SECURITY POLICY DEFINED BY
THE LOCAL POLICY DECISION POINT BASED ON THE SLICE
SECURITY POLICY
B616

MEMORY

712

PROCESSOR(S)

714

PRESENTATION
COMPONENT(S)

716

RADIO(S)

724

I/O PORT(S)

718

I/O COMPONENTS

720

POWER SUPPLY

722

710

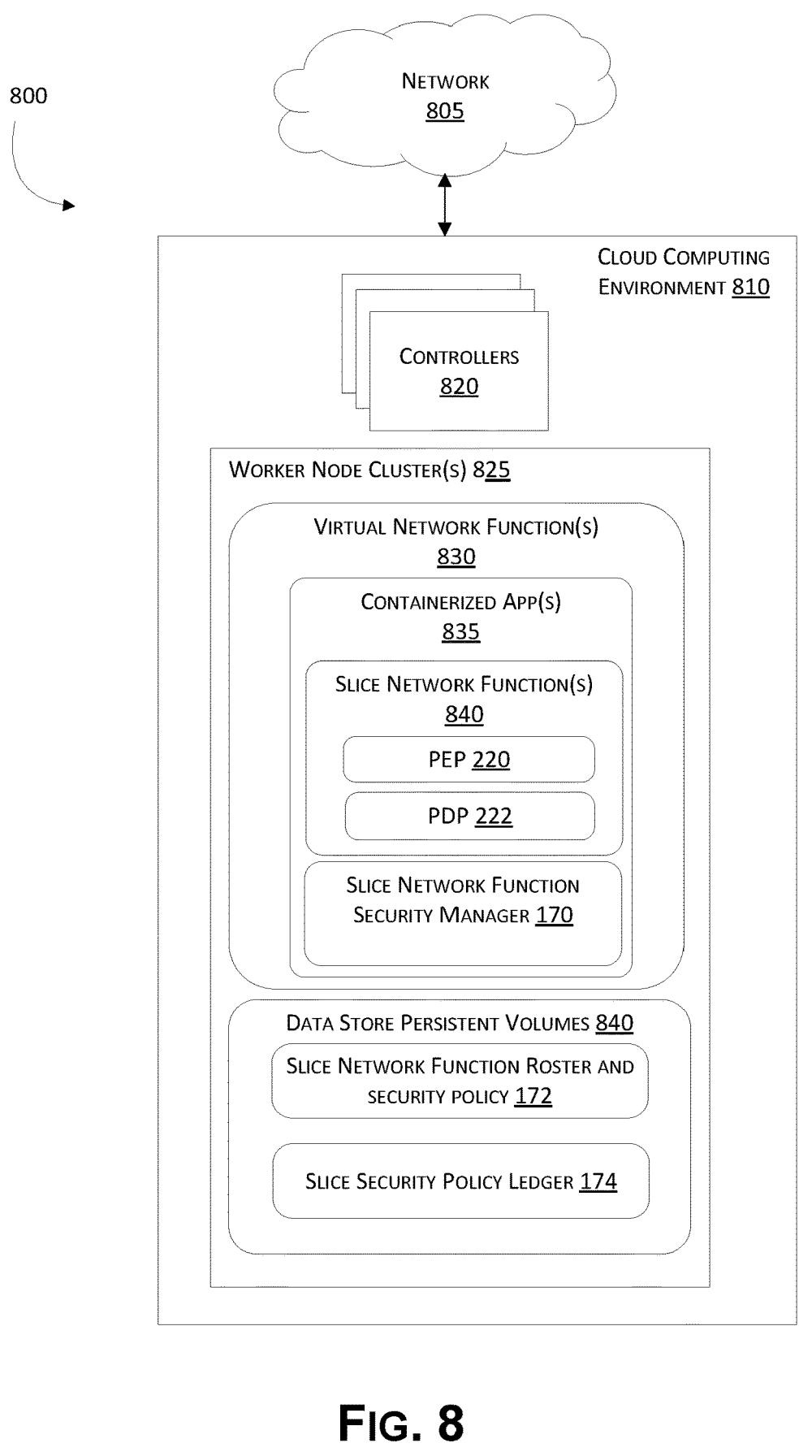

800

NETWORK
805

CLOUD COMPUTING
ENVIRONMENT 810

CONTROLLERS
820

WORKER NODE CLUSTER(S) 825

VIRTUAL NETWORK FUNCTION(S)
830

CONTAINERIZED APP(S)
835

SLICE NETWORK FUNCTION(S)
840

PEP 220

PDP 222

SLICE NETWORK FUNCTION
SECURITY MANAGER 170

DATA STORE PERSISTENT VOLUMES 840

SLICE NETWORK FUNCTION ROSTER AND
SECURITY POLICY 172

SLICE SECURITY POLICY LEDGER 174

FIG. 8

TRUST ARCHITECTURE FOR TELECOMMUNICATION NETWORK SLICE SECURITY

BACKGROUND

A 5G network slice is a telecommunications network configuration that establishes multiple independent virtualized networks on the common physical infrastructure of a 5G network operator core. For each network slice instance, associated network functions can be orchestrated as needed to support the specific needs and/or use case of the customer using the network slice. Network resources allocated to a network slice may be tailored to customize parameters such as bandwidth, speed, and latency. A network slice may be established for a customer by the 5G network operator as a service that essentially provides the customer with a private end-to-end networking solution that includes complete logical isolation from other slices operating on the same physical infrastructure elements of the 5G network operator core and through common access networks (e.g., radio access networks).

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

One or more of the embodiments presented in the disclosure provide for, among other things, systems and methods for a trust architecture for telecommunication network slice security. Embodiments, of the present disclosure, at least in part, address the shortcomings of traditional telecommunications network security by using a trust architecture for telecommunication network slice security that distributes network security functionality to the individual network entities that constitute elements of the network slice, whether they are network functions of the network operator core, network functions implemented by nodes of the network edge, radio access networks (e.g., base stations), network gateways, user equipment (UE), and/or other resources of, or accessible through, the telecommunications network. In some embodiments, the trust architecture may extend to enforcing policies for accessing resources of, or available through, an enterprise network that defines one or more endpoints of a network slice. Slice network functions each individually implement components of the trust architecture for the network slice using a policy enforcement point (PEP) and a policy decision point (PDP). The PEP may be responsible for enforcing access control policies related to slice network functions. It's a component that evaluates incoming requests for resources or services and decides whether to allow or deny access based on predefined policies. PEPs enforce these policies on the slice network functions and services to ensure that only authorized entities can access those resources and services. The PDP may be responsible for making access control decisions. It can takes inputs from various sources, such as user profiles, policies, and contextual information, and determines whether a particular access request should be granted or denied. A PDP thus sets the rules and policies that a PEP follow when making access decisions for entities seeking a service from a slice network function. Each slice network function thus validates the authenticity and authorized privileges associated with the subject entity seeking a service from that slice network function, and grants or denies such service requests based on a policy implemented by the PEP and PDP.

BRIEF DESCRIPTION OF THE DRAWINGS

Aspects of the present disclosure are described in detail herein with reference to the attached Figures, which are intended to be exemplary and non-limiting, wherein:

FIG. 6 is a flow chart illustrating an example method for telecommunication network slice security, in accordance with some embodiments described herein;

FIG. 8 is an example cloud computing platform, in accordance with some embodiments described herein.

DETAILED DESCRIPTION

Figure 1:
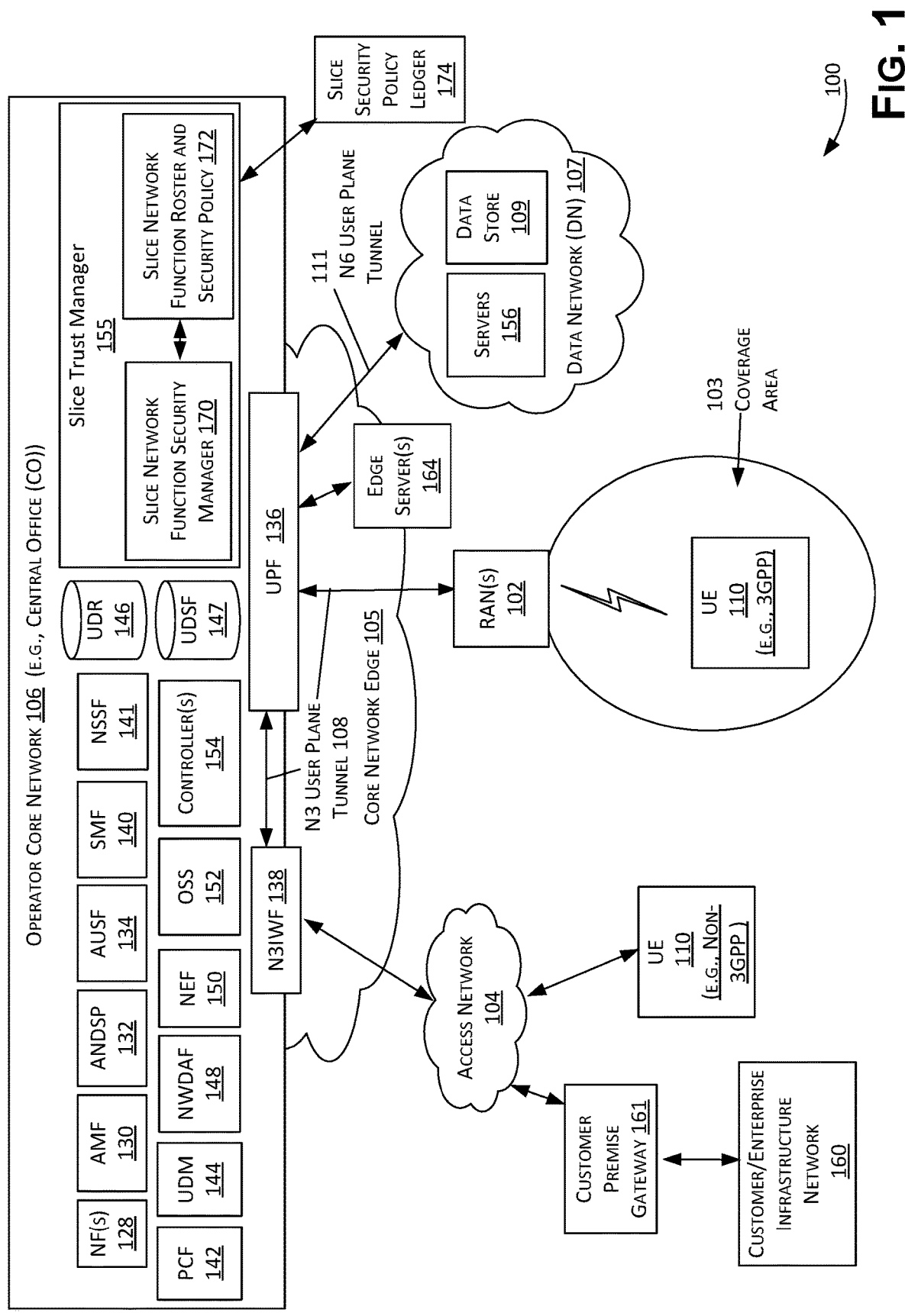
FIG. 1 is a diagram illustrating an example network environment for a telecommunications network, in accordance with some embodiments described herein.

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical, and electrical changes may be made without departing from the scope of the present disclosure. The following detailed description is, therefore, not to be taken in a limiting sense.

One or more of the embodiments presented in the disclosure provide for, among other things, systems and methods for a trust architecture for telecommunication network slice security. Traditional network security for infrastructure networks, such as telecommunications network cores, is substantially based on applying a trust-but-verify philosophy where users and endpoint devices located within the network's perimeter (e.g., within the network edge) are trusted, and users and endpoint devices outside the perimeter authenticate with gateways on the network perimeter to gain access to services provided by and/or via the telecommunications network. For example, a 3GPP-based user device, which may be referred to as user equipment (UE), may authenticate itself at the point of connecting to a radio access network (RAN) of the 5G network using credentials stored on a subscriber identify module SIM card (or eSIM). 3GPP validation may establish the UE as a trusted device on the network. A network slice is a telecommunications network configuration that establishes multiple independent virtualized networks on the common physical infrastructure of a network operator core. As such, a network slice may represent a logical or physical grouping of network functions deployed to provide connectivity over the telecommunications network. Traditional security for a network slice comprises authentication of UE and users permitted to access the network slice. The corresponding credentials to authenticate with the network slice may be the same as, or separate from, the authentication used by UE to obtain access to the 5G network.

The use of dedicated network slices to support use cases such as specialized device networks (e.g., Internet of Things (IoT) devices) and/or dedicated enterprise networks, for example, is significantly growing. This growth in the use of 5G network slices presents a corresponding increase in the number and types of attack vectors that may be used to disrupt 5G network operations and/or gain access to proprietary and/or sensitive data. Traditional 5G network security provisions may not address, or may only partially address, the individual security needs associated with a network slice—which may vary substantially from slice to slice depending on the type of data and resources that are being made accessible through the network slice. Furthermore, while each network slice may be designed to operate as a distinct entity, previously identified security vulnerabilities (e.g., zero-day threats) exploited on one network slice may potentially have the ability to affect the operation of the underlying infrastructure and/or otherwise circumvent measures that enforce isolation between slices.

Embodiments of the present disclosure, at least in part, address the shortcomings of traditional telecommunications network security by using a trust architecture for telecommunication network slice security that distributes network security functionality to the individual network entities that constitute elements of the network slice, whether they are network functions of the network operator core, network functions implemented by nodes of the network edge, radio access networks (e.g., base stations), network gateways, UE, and/or other resources of, or accessible through, the telecommunications network. In some embodiments, the trust architecture may extend to enforcing policies for accessing resources of, or available through, an enterprise network that defines one or more endpoints of a network slice.

More specifically, in some embodiments, slice network functions that through their interactions with other slice network functions support operation of the network slice may be defined as network slice resources. Slice network functions are services and functionalities provided with the virtual network slices in the network slice. These functions can include various network services such as, but not limited to, routing, security (e.g., authentication, authorization), traffic management and others depending up on the intended objective of the network slice. As slice network functions, these resource elements each individually implement components of the trust architecture for the network slice that include a policy enforcement point (PEP) and a policy decision point (PDP). That is, each slice network function validates the authenticity and authorized privileges associated with the subject entity seeking a service from that slice network function, and grants or denies such service requests based on a policy implemented by the PEP and PDP. As the term is used herein, a service request may include a function call, message, query, or any other form of request sent to a slice network function seeking to access a service provided by that network slice (e.g., to obtain information or initiate an action).

As discussed in greater detail herein, the PEP and PDP may be implemented by software integrated within a slice network function when orchestrated, or subsequently augmented into the slice network function by a centralized slice network function security manager. In some embodiments, when a network slice is instantiated by the operator core network, each slice network function orchestrated for that network slice (whether those slice network functions are entities of the network operator core, the network edge, access networks, UE-implemented functions, or functions implemented by other entities of the network slice) may be identified in a slice network function roster and security policy. When a network slice is created, the slice network function security manager may populate the slice network function roster and security policy with data identifying the slice network functions for that slice, and the corresponding security policy that is enforced by the PEP and PDP instances for the respective slice network function. The security policy for a slice network function may be pushed by the slice network function security manager to the PEP and PDP for that slice network function. The PEP and PDP may then work in conjunction as a pair to grant or deny service requests based on the security policy. As discussed herein, the PEP essentially functions as a gatekeeper that is responsible for enforcing access control policies and making sure that any device, user, or other network function that tries to connect to its associated slice network function has the proper privileges to be able to access that slice network function as a resource offered by the network slice. The PEP may be responsible for enforcing access control policies related to slice network functions. It is a component that evaluates incoming requests for resources or services and decides whether to allow or deny access based on predefined policies. PEPs enforce these policies on the slice network functions and services to ensure that only authorized entities can access those resources and services. The PDP works in tandem with the PEP to make sure that the PEP executes the proper access control decisions by looking at the policies that that user or device should have and what access the requesting device, user, or other network function should be granted or not granted. The PDP may therefore be responsible for making access control decisions. It can takes inputs from various sources, such as user profiles, policies, and contextual information, and determines whether a particular access request should be granted or denied. A PDP thus sets the rules and policies that a PEP follow when making access decisions for entities seeking a service from a slice network function. If the local PEP/PDP pair are not able to ascertain the proper policy for evaluating a given service request, then the slice network function security manager may be consulted as the final decision maker. In this way, the network slice inherently is built on a trust architecture that holistically addresses slice security at the level of each transaction that occurs within the network slice, and not merely at entry points to the perimeter of the 5G network. For instances where a new slice network function is added to an existing network slice, it may be added to the slice network function roster and the PEP/PDP for that new slice network function configured with a security policy generated by the slice network function security manager.

As mentioned above, a network slice may establish a private end-to-end networking solution that permits a customer of the network operator (e.g., an enterprise customer) to leverage telecommunications and data connectivity and/ or other services to support one or more systems, processes, and/or objectives of the enterprise customer. As such, in some embodiments, resources of an enterprise infrastructure network connected to the network slice (and which may, or may not, define endpoints of the network slice) may be made accessible as network slice resources to other entities through the slice network functions of the network slice. In some embodiments, a network gateway serving as an interface between the 5G network and the enterprise network may include a slice network function that comprises a local PEP and PDP that evaluate traffic between the networks and may grant or deny service requests originating from the 5G network for access to resources on the enterprise network based on a security policy defined by the slice network function roster and security policy and enforced by the gateway's local PEP and PDP. In other embodiments, other slice network functions may be used to establish a trust architecture to protect access to the enterprise network resources. For example, in some embodiments, the slice network function security manager for the 5G network may communicate with a security manager for the enterprise network and set security policies for slice network functions of the network slice based on policies provided by the enterprise network security manager. As an example, in some embodiments, slice network functions such as an operator core network user place function (UPF) instance and/or network exposure function (NEF) instance for the network slice used by the enterprise network may be configured with a security policy from the enterprise network security manager that prohibits transport of data traffic through those functions originating from external data networks. As another example, in some embodiments, a local PEP and PDP of a slice network function for an RAN may be configured with a security policy that regulates the type of radio access technology (RAT) that may be used by wireless 3GPP UE allowed to connect to the network slice. As such, undesired attempts to access resources of the enterprise infrastructure network may be deterred prior to those attempts reaching the gateway, with multiple enforcement points in place between the requesting entity and the resource to thwart the access attempts.

In some embodiments, the security policy pushed to the local PEP/PDP at least in part grants access based on a principle of context-based access control. That is, the security policy defined by the slice network function roster for each slice network function is tailored to provide a slice network function with access privileges, in terms of both scope and access level, no greater than what is necessary to complete a task, but those access privileges may vary per the security policy being enforced by the local PEP/PDP depending on the task that the subject entity is attempting to perform.

FIG. 1 is a diagram illustrating an example network environment 100 embodiment for a wireless communication system. Network environment 100 is but one example of a suitable telecommunications network and is not intended to suggest any limitation as to the scope of use or functionality of the embodiments disclosed herein. Nor should the network environment be interpreted as having any dependency or requirement relating to any one or combination of components illustrated.

As shown in FIG. 1, network environment 100 comprises an operator core network 106 (also referred to as a "core network") that provides one or more network services to one or more UEs 110 (e.g., 3GPP UE and/or non-3GPP UE) via at least one access network, such as radio access network (RAN) 102 and/or access network (AN) 104. In some embodiments, network environment 100 comprises, at least in part, a wireless communications network.

In some embodiments, the network environment 100 comprises one or more radio access networks (RANs) 102. Each RAN may provide wireless connectivity access to one or more UEs operating within a coverage area 103 associated with that RAN 102. An RAN is often referred to as a base station, cell site, or cellular base station. The RAN 102 may implement wireless connectivity using, for example, 3GPP technologies. The RAN 102 may be referred to as an eNodeB in the context of a 4G Long-Term Evolution (LTE) implementation, a gNodeB in the context of a 5G New Radio (NR) implementation, or other terminology depending on the specific implementation technology. In some embodiments, the RAN 102 may comprise, at least in part, components of a customer premises network, such as a distributed antenna system (DAS), for example.

The access network 104 may comprise a non-3GPP customer premises network, such as a local area network or intranet. The access network 104 may provide wired and/or wireless access to one or more elements of a customer infrastructure network 160 (e.g., an enterprise infrastructure network) via a customer premise gateway 161. The access network 104 may provide access to one or more non-3GPP UEs 110 via wired connections and/or wireless access points (WAPs) such as, but not limited to, IEEE 802.11 (WiFi) and/or IEEE 802.15 (Bluetooth) access points.

One or both of radio access network 102 and/or access network 104 may comprise a multimodal network (for example, comprising one or more multimodal access devices) where multiple radios supporting different systems are integrated into the networks 102 and 104. Such a multimodal access network may support a combination of 3GPP radio technologies (e.g., 4G, 5G, and/or 6G) and/or non-3GPP radio technologies. In some embodiments, the radio access network 102 may comprise a terrestrial wireless communications base station and/or may be at least in part implemented as a space-based access network, such as a base station implemented by an Earth-orbiting satellite.

Individual 3GPP UE 110 may communicate with the operator core network 106 via the RAN 102 over one or both of uplink (UL) radio frequency (RF) signals and downlink (DL) radio frequency (RF) signals. Individual UE 110 may also, or instead, communicate with the operator core network 106 as non-3GPP devices via the access network 104 over one or both of uplink (UL) radio frequency (RF) signals and downlink (DL) radio frequency (RF) signals, and/or via wired network connections (e.g., via customer infrastructure network 160 and/or customer premise gateway 161).

The radio access networks 102 and/or access network 104 may be coupled to the operator core network 106 via a core network edge 105 that comprises wired and/or wireless network connections that may themselves include wireless relays and/or repeaters. In some embodiments, the RAN 102 and/or access network 104 may be coupled to the operator core network 106 at least in part by a backhaul network such as the Internet or other public or private network infrastructure. Core network edge 105 may comprise one or more network nodes or other elements of the operator core network 106 that may define the boundary of the operator core network 106 and may serve as the architectural demarcation point where the operator core network 106 connects to other networks such as, but not limited to, RAN 102 and/or access network 104, the Internet, and/or other third-party networks. In some embodiments, the network edge 105 may comprise one or more network nodes that include edge server(s) 164. Edge server(s) 164 may provide, for example, edge-based services to UE 110 that may be accessed separately from services provided by network functions of the operator core network 106. For example, edge server(s) 164 may host databases, caches, microservices, ledgers, decentralized applications (e.g., DApps), and/or may perform data traffic monitoring, inspections, and/or aggregation for other network functions of the network environment 100.

It should be understood that in some aspects, the network environment 100 may not comprise a distinct network operator core 106, but rather may implement one or more features of the network operator core 106 within other portions of the network, or may not implement them at all, depending on various carrier preferences.

As shown in FIG. 1, network environment 100 may also comprise at least one data network (DN) 107 coupled to the operator core network 106 (e.g., via the network edge 105). Data network 107 may include a data store 109. In some embodiments, UE 110 may access services and/or content provided by one or more content-services servers 156 of DN 107.

Generally, an individual UE 110 may comprise a device capable of unidirectional or bidirectional communication with the operator core network 106 via wireless and/or wired communication links. The network environment 100 may be configured for wirelessly connecting UEs 110 to other UEs 110 via the same access networks (e.g., 102 and 104), via other access networks, via other telecommunication networks, and/or to connect UEs 110 to a public switched telecommunication network (PSTN).

The network environment 100 may be generally configured for connecting a UE 110 to data or services that may be accessible on one or more application servers or other functions, nodes, or servers. The network environment 100 may be generally configured, in some embodiments, for connecting UE 110 to data, content, and/or services that may be accessible from one or more application servers or other functions, nodes, or servers (such as by servers 156 of data network 107). In allocating network resources and access to these data or services, the network operator core 106 may execute one or more network slices that each implement a network slice trust architecture, as described herein. Within the context of the network slice as described herein, an individual UE 110 may function in the capacity of a subject entity that requests services from other slice network functions and/or a resource entity that provides services to other slice network functions within their network slice implemented by environment 100.

UEs 110 are in general forms of equipment and machines such as, but not limited to, Internet of Things (IoT) devices and smart appliances, autonomous or semi-autonomous vehicles including cars, trucks, trains, aircraft, urban air mobility (UAM) vehicles and/or drones, industrial machinery, robotic devices, exoskeletons, manufacturing tooling, thermostats, locks, smart speakers, lighting devices, smart receptacles, controllers, mechanical actuators, remote sensors, weather or other environmental sensors, wireless beacons, cash registers, turnstiles, security gates, or any other smart device. That said, in some embodiments, UE 110 may include computing devices such as, but not limited to, handheld personal computing devices, cellular phones, smart phones, tablets, laptops, and similar consumer equipment, or stationary desktop computing devices, workstations, servers, and/or network infrastructure equipment. As such, the UE 110 may include both mobile UE and stationary UE. As previously mentioned, UE 110 may comprise 3GPP and non-3GPP devices. A UE 110 can include one or more processors and one or more non-transient computer-readable media for executing code to carry out the functions of the UE 110 described. The computer-readable media may include computer-readable instructions executable by the one or more processors. In some embodiments, the UE 110 may be implemented using a computing device 700, as discussed below with respect to FIG. 7.

In some implementations, the operator core network 106 may comprise modules, also referred to as network functions (NFs), generally represented in FIG. 1 as NF(s) 128. Such network functions may include, but are not limited to, one or more of a core access and mobility management function (AMF) 130, an access network discovery and selection policy (ANDSP) 132, an authentication server function (AUSF) 134, a user plane function (UPF) 136, non-3GPP interworking function (N3IWF) 138, a session management function (SMF) 140, a network slice selection function (NSSF) 141, a policy control function (PCF) 142, unified data management (UDM) 144, a unified data repository (UDR) 146, an unstructured data storage function (UDSF) 147, a network data analytics function (NWDAF) 148, a network exposure function (NEF) 150, and an operations support system (OSS) 152. Implementation of these NFs of the operator core network 106 may be executed by one or more controllers 154 on which these network functions are orchestrated or otherwise configured to execute utilizing processors and memory of the one or more controllers 154. The NFs may be implemented as physical and/or virtual network functions, container network functions, and/or cloud-native network functions, such as is described with respect to FIG. 8. Within the context of network slices created by the operator core network 106, the operator core network 106 may orchestrate individual dedicated instances of one or more of the network functions described herein to establish and support operation of a network slice.

Notably, the nomenclature used herein is used primarily with respect to the 3GPP 5G architecture. In other aspects, one or more of the network functions of the operator core network 106 may take different forms, including consolidated or distributed forms that perform the same general operations. For example, the AMF 130 in the 3GPP 5G architecture is configured for various functions relating to security and access management and authorization, including registration management, connection management, paging, and mobility management. In other forms, such as a 4G architecture, the AMF 130 of FIG. 1 may take the form of a mobility management entity (MME). The operator core network 106 may be generally said to authorize rights to and facilitate access to an application server/service, such as provided by application function(s) requested by one or more UEs, such as UE 110. In some embodiments, the NSSF 141 works in conjunction with the AMF 776 to establish network slice instances, such as is described herein.

As shown in FIG. 1, UPF 136 represents at least one function of the operator core network 106 that may extend into the core network edge 105. In some embodiments, the RAN 102 is coupled to the UPF 136 within the core network edge 105 by a communication link that includes an N3 user plane tunnel 108. For example, the N3 user plane tunnel 108 may connect a cell site router of the RAN 102 to an N3 interface of the UPF 136. The data store 109 may be coupled to the UPF 136 in the core network edge 105 by an N6 user plane tunnel 111. For example, the N6 user plane tunnel 111 may connect a network interface (e.g., a switch, router, and/or gateway) of the DN 107 to an N6 interface of the UPF 136. In some embodiments, the operator core network 106 may comprise a plurality of UPFs 136, such as a UPF at the operator core network 106 and a UPF at the core network edge 105. For example, a UPF at the core network edge 105 may be used for local breakout and/or low latency types of application via an N9 interface between the two UPFs.

The AMF 130 facilitates mobility management, registration management, and connection management for 3GPP devices, such as a UE 110. ANDSP 132 facilitates mobility management, registration management, and connection management for non-3GPP devices. AUSF 134 may receive authentication requests from the AMF 130 and interacts with UDM 144, for example, for SIM authentication and/or to authenticate a UE 110 based on a generated device identification (ID). N3IWF 138 provides a secure gateway for non-3GPP network access, which may be used for providing connections for UE 110 access to the operator core network 106 over a non-3GPP access network. For example, a data link may be established between the customer premise gateway 161 and the N3IWF 138 via the access network.

SMF module 140 facilitates initial creation of protocol data unit (PDU) sessions using session establishment procedures. The PCF 142 maintains and applies policy control decisions and subscription information. Additionally, in some aspects, the PCF 142 maintains quality of service (QoS) policy rules. For example, the QoS rules stored in a unified data repository (UDR) 146 can identify a set of access permissions, resource allocations, or any other QoS policy established by an operator. The Unstructured Data Storage Function (UDSF) 147 may store dynamic state data, which is structured and unstructured data related to network function of the operator core network 106. That is, the UDSF 147 may support storage and retrieval of structured and/or unstructured data by other network functions 128 of the operator core network 106, including information relating to access control and service and/or microservice subscriptions.

In some embodiments, the PCF 142 maintains subscription information indicating one or more services and/or microservices subscribed to by each UE 110. In some embodiments, a PCF 142 instance for a network slice may maintain subscription information pertaining to UE 110 authorized to access services from within the network slice. The UDM 144 manages network user data including, but not limited to, data storage management, subscription management, policy control, and core network 106 exposure. NWDAF 148 collects data (for example, from UE; other network functions; application functions; and operations, administration, and maintenance [(OAM) systems) that can be used for network data analytics. The OSS 152 is responsible for the management and orchestration of the operator core network 106 and the various physical, virtual network functions, container network functions, controllers, computer nodes, and other elements that implement the operator core network 106.

Some aspects of network environment 100 include the UDR 146 storing information relating to access control and service and/or microservice subscriptions. The UDR 146 may be configured to store information relating to such subscriber information and may be accessible by multiple different network functions (NFs) 128 in order to perform desirable functions. For example, the UDR 146 may be accessed by the AMF 130 in order to determine subscriber information pertaining to the UE 110, accessed by a PCF 142 to obtain policy-related data, accessed by NEF 150 to obtain data that is permitted for exposure to third-party applications (such as applications executed by UE 110, for example). Other functions of the NEF 150 include monitoring of UE-related events and posting information about those events for use by external entities, and providing an interface for provisioning UEs (via PCF 142) and reporting provisioning events to the UDR 146. Although depicted as a unified data management module, UDR 146 can be implemented as a plurality of network function specific data management modules. As mentioned above, in the context of a network slice, the operator core network 106 may orchestrate individual instances of each of these network functions and other such network functions described herein that are dedicated to the network slice.

The UPF 136 is generally configured to facilitate user plane operation relating to packet routing and forwarding, interconnection to a data network (e.g., DN 107), policy enforcement, and data buffering, among other operations. Using network slicing (e.g., based on 5G software-defined networking managed by the 5G network slice selection function (NSSF) 141), the UPF 136 may establish a dedicated slice network function for one or more data channels between various network functions and other entities that act as, in essence, a distinct network (for example, establishing its own QoS, provisioning, and/or security) within the same physical network architecture of network environment 100. A network slice type may be used to identify service characteristics of a network slice, and at least in part may define the configuration of the slice network functions that make up that network slice. For example, in different implementations, a UE 110 may be assigned a network slick such as an Enhanced Mobile Broadband (eMBB) network slice, a Massive Machine Type Communications (MMTC) network slice, an Ultra-Reliable Low Latency Communication (URLLC) network slice, or a Public Safety (PS) network slice. A network slice instance, therefore, may comprise an instantiation of a specific network slice type.

In some embodiments, the access network 104 comprises a non-3GPP access network 104 (e.g., a customer premise equipment (CPE)/enterprise network). For example, the access network 104 may comprise a wide area network (WAN) or local area network (LAN) and/or may include one or more wireless access points (WAPs) used by one or more UEs 110. In such embodiments, the non-3GPP access network 104 may represent an untrusted network from the perspective of the operator core network 106, and the UEs 110 that access the access network 104 may represent untrusted UE 110. Accordingly, communication between the operator core network 106 and UE 110 connecting via the access network 104 may be established via the non-3GPP Interworking Function (N3IWF) 138. For example, in some embodiments, a UE 110 may authenticate with a WAP of the access network 104 to establish a wireless communications link with the access network 104. In some embodiments, a UE 110 may be coupled using a network cable to establish a wired network communication link with the access network 104.

The non-3GPP access network 104 may be coupled to, and authenticated with, the N3IWF 138 of the operator core network 106. For example, an IPsec user plane tunnel and/or IPsec control plane tunnel may be created to establish a secure communication link between the UE 110 and the N3IWF 138. The N3IWF 138 may be coupled to the UPF 136 by a communication link that includes an N3 user plane tunnel 108. For example, the N3 user plane tunnel 108 may connect a router or network gateway of the non-3GPP access network 104 to an N3 interface of the UPF 136. In some embodiments, a network slice may comprise a network of interconnected paths between the access network 104, RAN 102, and instances of slice network functions implemented by the operator core network and/or nodes (servers) of the core network edge 105.

As shown in FIG. 1, in some embodiments, a slice trust manager 155 of the operator core network 106 may include one or both of the slice network function security manger 170 and the slice network function roster and security policy 172 functions for establishing the trust architecture for the telecommunication network slice security described herein. In some embodiments, one or both of the slice network function security manger 170 and the slice network function roster may be integrated into other network functions of the operator core network 106 (such as the NSSF 141, for example) and/or implemented as stand-alone network functions of the operator core network 106. In some embodiments, when a network slice is instantiated (e.g., by the AMF 130), each slice network function orchestrated for that network slice (whether those slice network functions are entities of the network operator core 106, the network edge 105, access networks 102, 104, UE 110 implemented functions, or functions implemented by other entities of the network slice) are identified in the slice network function roster and security policy 172. The slice network function security manager 170 may populate the slice network function roster and security policy 172 with data identifying the slice network functions for that slice, and may populate the corresponding security policy that is enforced by the PEP and PDP instances for the respective slice network function.

In some embodiments, security policy parameters included in the slice network function roster and security policy 172 are derived from records of a slice security policy ledger 174. That is, in some embodiments, initial predefined slice security policy parameters may be retrieved from the slice security policy ledger 174 as part of the orchestration of the network slice instance 210, including parameters that regulate the behaviors of the PEP 220 and PDP 222 instances for the individual slice network functions of the network slice instance 210 shown in FIG. 2. If changes are made to the slice network function roster and security policy 172, the slice security policy ledger 174 may be updated by the slice network function security manager 170 to reflect those changes. In some embodiments, the slice security policy ledger 174 is a blockchain technology and/or hyperledger-based technology ledger storing data defining the security policy for implementing the trust architecture 200 as immutable data records and/or blocks in the slice security policy ledger 174. For example, in some embodiments, the slice network function security manager 170 may execute one or more decentralized applications (DApps) or other applications based on blockchain technology to read records from, and write records to, the slice security policy ledger 174.

Figure 2:
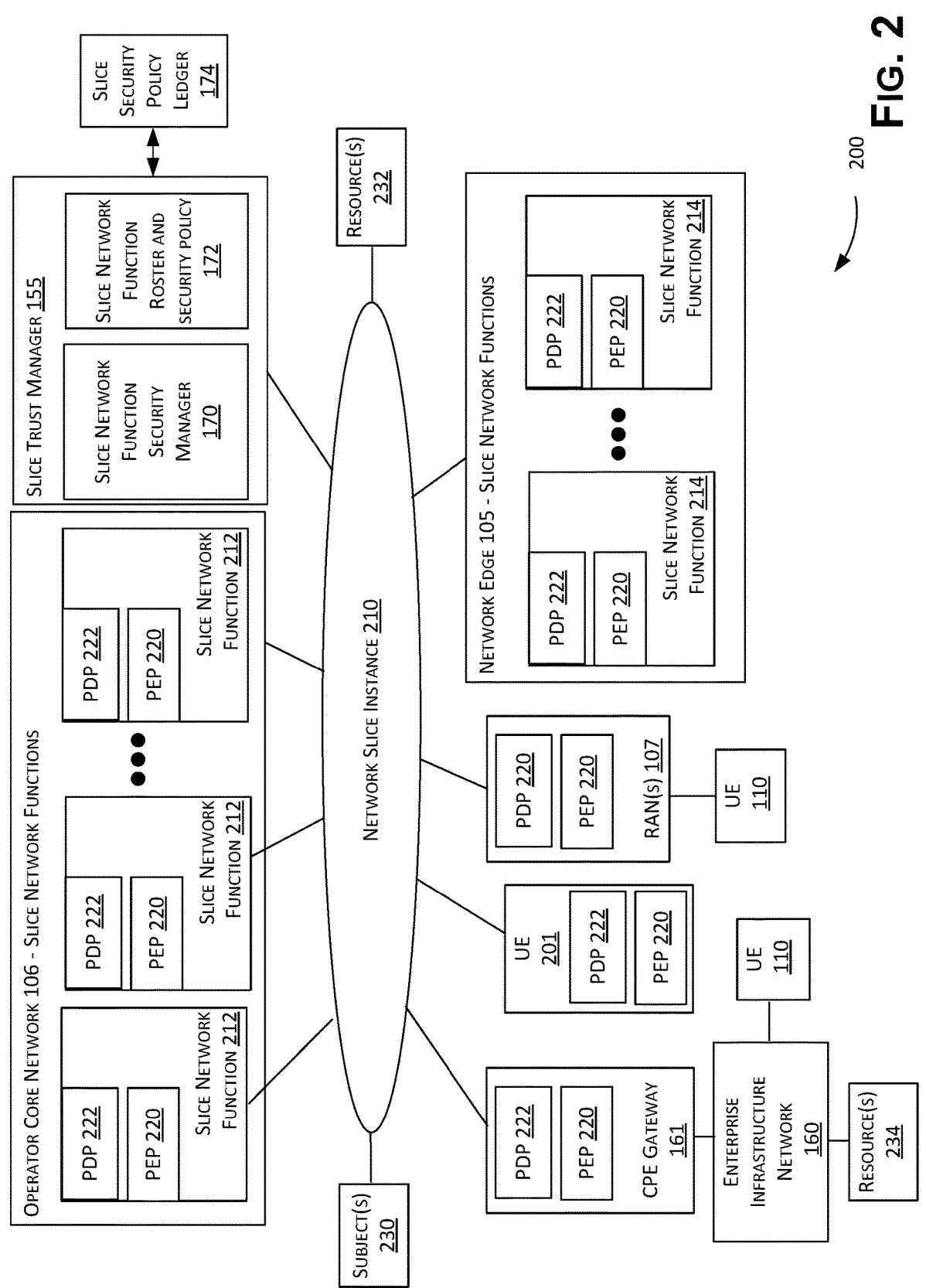
FIG. 2 is a diagram illustrating an example trust architecture for telecommunication network slice security, in accordance with some embodiments described herein.

Referring now to FIG. 2, FIG. 2 illustrates an example trust architecture 200 for telecommunication network slice security for a network slice instance 210, such as the telecommunications network of network environment 100 illustrated in FIG. 1. As discussed herein, the trust architecture 200 for a network slice instance 210 may include a plurality of slice protection points, each slice protection point corresponding to a respective entity of the network slice instance 210, as defined by the slice trust manager 155. In this trust architecture 200 for network slice instance 210 shown in FIG. 2, each slice network function that—through their interactions with other slice network functions—supports operation of the network slice 210, may be defined as a network slice resource that implements a slice protection point comprising a PEP 220 and a PDP 222. In some embodiments, the PEP 220 and PDP 222 operate to grant or deny service requests received at their associated slice network function based on a security policy managed by the slice network function security manager 170.

Each pair of PEP 220 and PDP 222 enforces security policy provisions provided by the slice network function security manager 170 that are particularly tailored for their associated slice network function. The PEP 220 is responsible for enforcing the security policies and making sure that a service-requesting entity (e.g., a device, user, or other slice network function) that tries to connect to its associated slice network function has the proper privileges to be able to access that slice network function as a resource offered by that slice network function. The PDP 222 may evaluate received service requests and control the PEP 220 to execute the proper access control decisions based on what security policies apply to the requesting subject entity (e.g., the requesting device, user, or other slice network function), and what access the requesting subject should be granted or not granted. If the local PEP 220/PDP 222 are not able to ascertain the proper policy for evaluating a given service request, then the PDP 222 may query the slice network function security manager 170 with information about the request and/or the requestor for an access decision. In some embodiments, the slice network function security manager 170 may transmit and update to the security policy provisions of the querying local PDP 222 with security policy provisions applicable to the service request so that the PEP 220/PDP 222 may respond to the request accordingly. Each PEP 220 and PDP 222 may be implemented by software integrated within a slice network function when orchestrated, or subsequently augmented into the slice network function by the slice network function security manager 170.

When the network slice instance 210 is instantiated by the network operating core 106, each instance of a slice network function orchestrated for that network slice instance 210 (whether those slice network functions are entities of the network operator core 106, the network edge 105, access networks 102, 104, UE 110 implemented functions, or functions implemented by other entities of the network slice) is identified in the slice network function roster and security policy 172. Each of these slice network functions define a distinct network slice resource that support operation of the network slice 210 through their interactions with other slice network functions. In some embodiments, a trusted network slice may refer to a network slice that is made up of slice network functions associated with a slice trust manager 155.

For the example network slice instance 210 of FIG. 2, network slice instance 210 may include one or more slice network functions 212 corresponding to network functions of the operator network core 106 (such as, but not limited to, any of the network functions of the operator network core 106 discussed with respect to FIG. 1). For example, one slice network function 212 may comprise a network slice instance of the UDR 146, and another slice network function 212 may comprise a network slice instance of the AMF 130. When the AMF 130 network slice instance attempts to access the UDR 146 network slice instance (e.g., to determine subscriber information pertaining to a UE 110), the service request from the AMF 130 network slice instance is evaluated against the security policy defined by the local PDP 222 of the UDR 146 network slice instance, and the local PEP 220 either grants or denies the service request in accordance with the security policy. If granted, then the UDR 146 network slice instance may respond with the requested subscriber information. If not granted, then the UDR 146 network slice instance may either ignore the request or return an error message to the UDR 146 network slice instance. Other network slice instances corresponding to operator core network 106 functions operating within the network slice instance 210 may similarly evaluate a service request locally against the security policy defined by their local PDP 222 and apply the security policy to the request accordingly. For example, each request to transport user plane traffic through a UPF 136 network slice instance of the network slice instance 210 may be granted or denied based on the local PEP 220 and PDP 222 of the UPF 136 network slice instance applying its respective security policy.

As mentioned above, other components of the network environment 100 may constitute or define slice network function elements of the network slice instance 210. For example, the edge network 105 may comprise one or more network nodes (e.g., edge server(s) 164) that host functions accessible by other entities of the network slice instance 210. The edge network 105 and/or edge service 164 may therefore host one or more slice network functions 214 that comprise instances of functions executed at the network edge 105 dedicated to the network slice instance 210. The slice network function(s) 214 individually includes a local PEP 220 and PDP 222 that may function in the same way as described for the network function instances 212. That is, at the slice network function(s) 214, the local PDP 222 may evaluate received service requests, and the PEP 220 then executes the proper access control decisions based on what security policies apply to the requesting subject and what access the requesting subject should be granted or not granted per the local PDP 222. If the local PEP 220/PDP 222 of a network edge slice network function 214 are not able to ascertain the proper policy for evaluating a given service request, then the PDP 222 may query the slice network function security manager 170 with information about the request and/or the requestor for an access decision.

Also, as shown in FIG. 2, network gateways (such as customer premise gateway 161 between the operator core network 106 and an enterprise infrastructure network 160), radio access networks/base stations (such as RAN 102) or other UEs 201 (e.g., like UE 110 but that may connect to the network slice instance 210 directly rather than via an access point of access network 104 or via RAN 102), may each operate as slice network functions of the network slice instance 210 that comprises a PEP 220 and PDP 222 and function as local slice protection points of the trust architecture 200, applying a security policy as directed by the slice network function security manger 170 and/or the slice network function roster and security policy 172.

As shown in FIG. 2, in some embodiments, other entities may be interconnected with the slice other than slice network functions. For example, resource nodes that include one or more data bases, data stores, or similar resources 232 connected to the network slice instance 210 may be pure resource elements (e.g., that respond to requests from other elements of the network slice instance 210 but do not generate quests). For such resources 232, access for sending service requests is obtained through at least one of the slice network functions of the network slice instance 210 that does implement a PEP 220 and PDP 222, and responses from the resources 232 are received by a slice network function and similarly evaluated by a PEP 220 and PDP before they are allowed to propagate through the slice 210 to the requesting entity. Similarly, the network slice instance 210 may provide access to enterprise resources 234 that are components of an enterprise infrastructure network 160. Such resources 234 may comprise other UEs, data servers, sensors, IoT devices, industrial or building equipment (e.g., fans, coolers, motors, lighting systems, security systems, or building infrastructure control systems) that may provide information and/or be controlled in response to communications from the network slice instance 210. For such resources 234, access for sending service requests may be obtained through at least one of the slice network functions of the network slice instance 210 that implements a PEP 220 and PDP 222, and responses from the resources 232 are received by a slice network function and similarly evaluated by a PEP 220 and PDP before they are allowed to propagate through the slice 210 to the requesting entity. Another example of entities that may be interconnected to the slice 210 are shown at 230 and referred to here as subject nodes, or subject(s) (230). Subjects 230 may comprise entities such as terminals or other devices, such as UE 110 in some cases, that may generate service requests to access resources of other entities of the network slice instance 210, but in some instances do not themselves offer resources to entities of the network slice instance 210. In this context, slice network functions of the network slice instance 210 may represent entities that are both resources (e.g., in that they may provide access to resources through service requests) and subjects (e.g., in that they may initiate requests to access resources through service requests). For example, a UDR 146 slice network function may be accessed as a network slice resource by the AMF 130 slice network function in order to determine subscriber information pertaining to the UE 110, accessed as a network slice resource by a PCF 142 slice network function to obtain policy-related data, and/or accessed as a network slice resource by an NEF 150 slice network function to obtain data that is permitted for exposure to third-party applications (such as applications executed by UE 110, for example).

Figure 3:
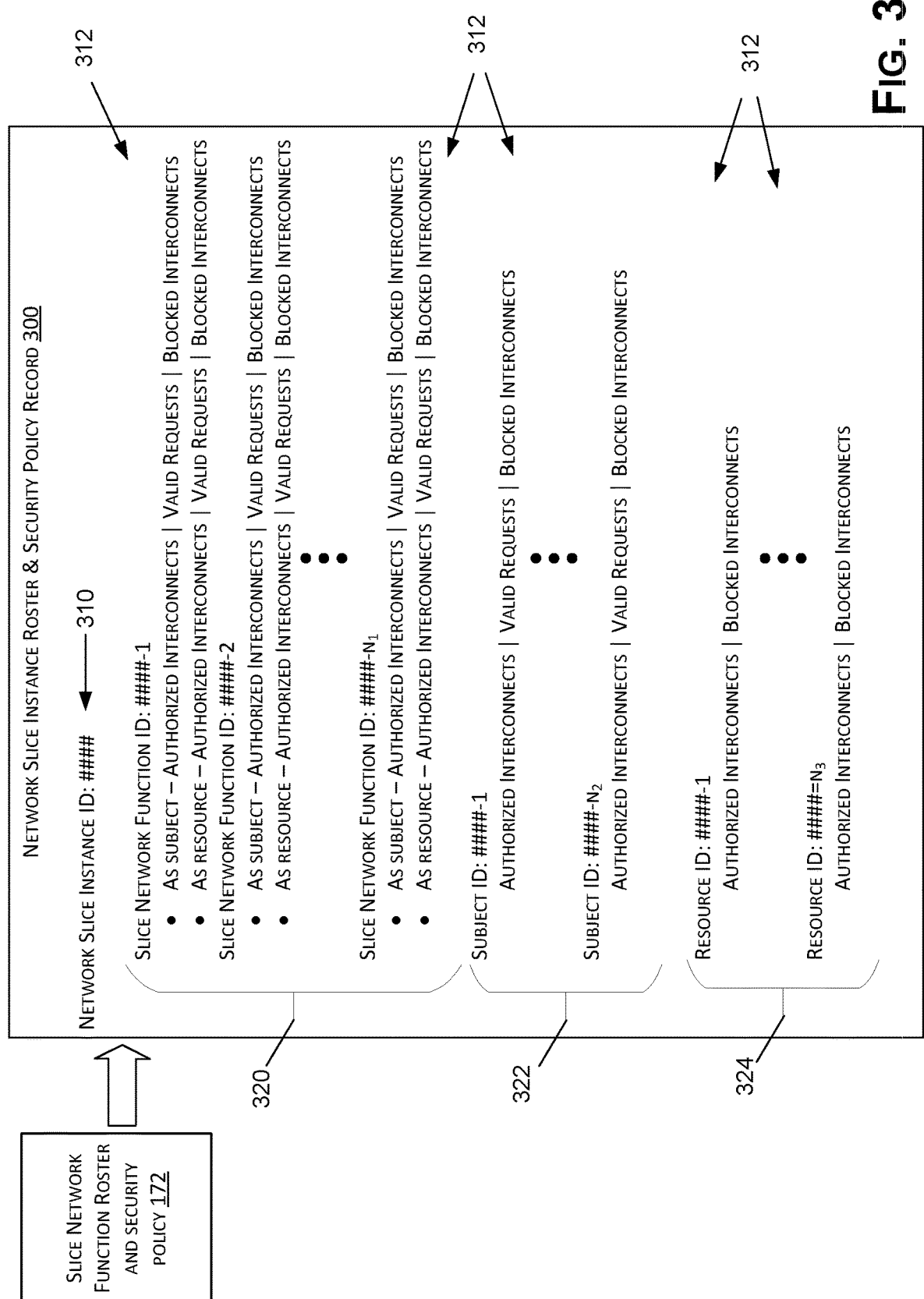
FIG. 3 is a diagram illustrating a slice instance roster and security policy record for a network slice instance, in accordance with some embodiments described herein.

Referring now to FIG. 3, FIG. 3 illustrates an example network slice instance roster and security policy record 300 from the slice network function roster and security policy 172 corresponding to a network slice instance. As shown in FIG. 3, record 300 may include a network slice instance identifier (ID) 310 that associates record 300 with a network slice instance (e.g., network slice instance 210). For the slice network functions of the network slice associated with the network slice instance ID 310, the record 300 defines a plurality of slice protection points 312 within the network slice instances that establish the trust architecture applied to the network slice instance. For example, record 300 includes security policies 320 corresponding to the slice network functions. In some embodiments, each slice network function is assigned a network slice instance ID (e.g., on orchestration of the network slice instance) which may be used to reference the security policy 320 associated with that network slice instance. A security policy 320 for a slice network function may indicate parameters such as one or more of, but not limited to, authorized interconnects, valid requests, and/or blocked interconnects. For example, in the context of the slice network function as a resource, the authorized interconnects parameter may identify which other elements of the network slice instance the slice network function can communicate with to receive service requests, while the blocked interconnects parameter may identify which other elements of the network slice instance the slice network function cannot communicate with to receive service requests. In some embodiments, the blocked interconnects parameter may serve as an affirmative flag or backstop indicating elements of the slice network function that the security policy should not be reconfigured to allow. The valid requests parameters may include definitions of what service requests are valid to grant based on, for example, an ID of the entity sending the service request and the resource the service request is attempting to gain access to. For example, the valid requests parameters may be tailored to provide a requesting slice network function with access privileges to a resource, in terms of both scope and access level, no greater than what is necessary to complete a task corresponding to the service request. Those access privileges may inform the security policy being enforced by the local PEP 220/PDP 222 depending on the task that the subject entity sending the request is attempting to perform. As mentioned above, a given slice network function may also operate in the context of a subject entity that makes service requests to other slice network function. As such, in the context of a subject entity, a security policy 320 may indicate parameters such as one or more of, but not limited to, authorized interconnects, valid requests, and/or blocked interconnects. In this context, the authorized interconnects parameter may identify which other elements of the network slice instance the slice network function can communicate with to send service requests, while the blocked interconnects parameter may identify which other elements of the network slice instance the slice network function cannot communicate with to send service requests. In some embodiments, the blocked interconnects parameter may again serve as an affirmative flag or backstop indicating elements of the slice network function that the security policy should not be reconfigured to allow. The valid requests parameters may include definitions of what service requests are valid to send based on, for example, an ID of the entity the service request is being requested from. As discussed herein, slice network functions may include one or more of, but not limited to, instances of network functions of the network operator core 106, network functions implemented by nodes of the core network edge 105, radio access networks 102 (e.g., base stations), network gateways (such as customer premises gateway 161), UE 110, and/or other resources of, or accessible through, the telecommunications network environment 100. For each slice protection point 312 associated with a slice network function, the slice network function security manger 170 may use the corresponding security policy 320 to configure the local security policy of the local PDP 222 for that slice network function. When a new slice network function is instantiated within a network slice instance, the record 300 of the slice network function roster and security policy 172 may be updated to include a security policy 320 for that new slice network function. As discussed herein, in some embodiments, the slice network function security manager 170 may execute one or more decentralized applications (DApps), or other applications based on blockchain technology, to record updates to record 300 to the slice security policy ledger 174 (e.g., by writing a new record to the slice security policy ledger 174.) In addition to the security policies 320 for slice network functions, other slice protection points 312 defined by a record 300 may include one or more security policies 322 for subject entities (such as subject entities 230) and/or one or more security policies 324 for resource entities (such as resource(s) 232). Such security policies 322 and/or 324 may not necessarily be directly implemented by a local PEP 220/PDP 222 pair, but include one or both of an authorized interconnects parameter to identify which other elements of the network slice instance they can communicate with, or a blocked interconnects parameter to identify which other elements of the network slice instance they cannot communicate with.

Figure 4:
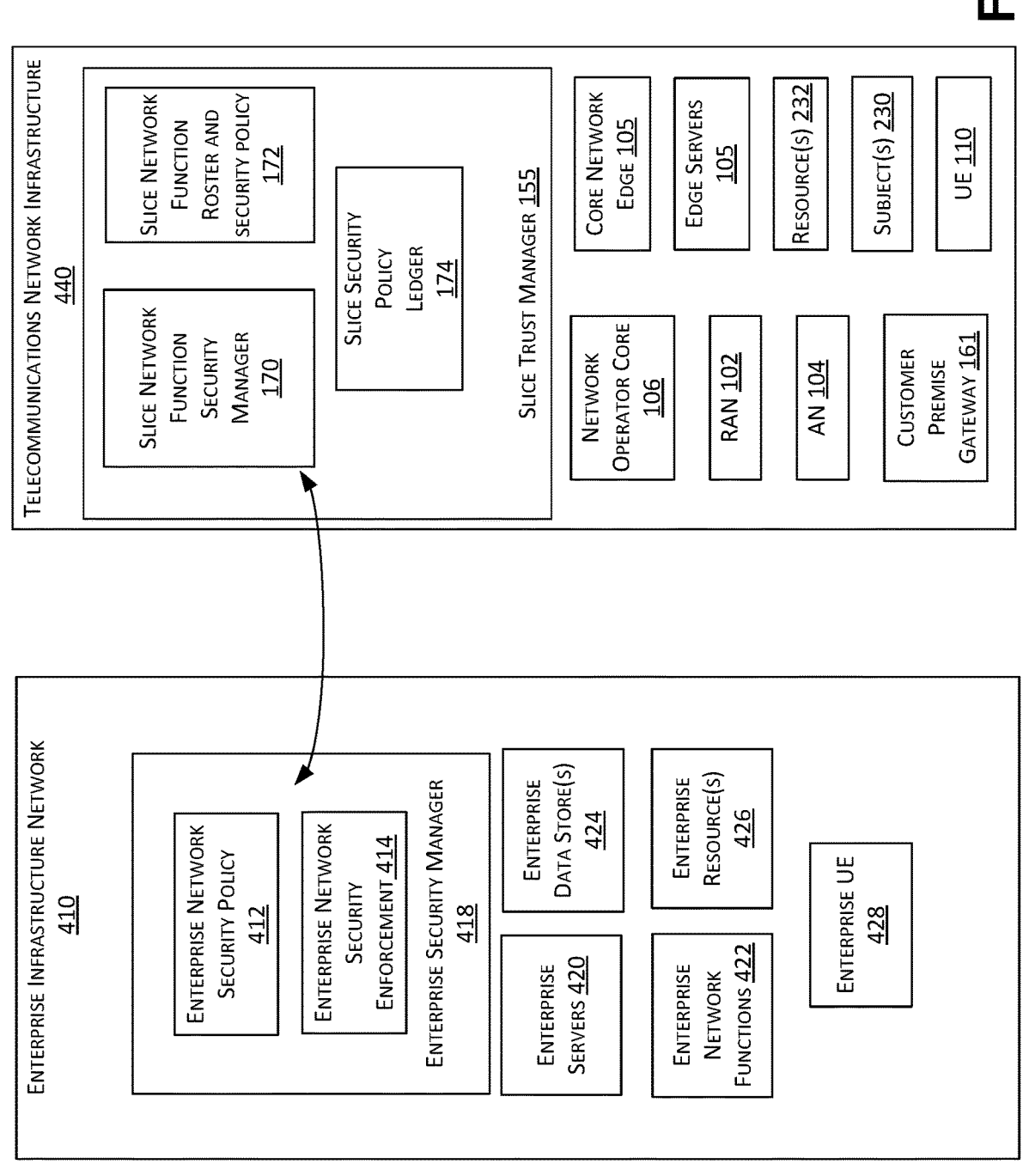
FIG. 4 is a diagram illustrating security policy coordination between an enterprise infrastructure network and a telecommunications network for a network slice instance, in accordance with some embodiments described herein.

Referring now to FIG. 4, as previously discussed, in some embodiments, resources of an enterprise infrastructure network 410 may be made accessible as network slice resources through one or more slice network functions of a network slice instance 210. A customer premise gateway 161 may serve as an interface between the telecommunications network infrastructure 440 of network environment 100 and the enterprise infrastructure network 410. The customer premise gateway 161 may include a slice network function that comprises a local PEP 220 and PDP 222 pair that evaluates traffic between the networks and may grant or deny service requests originating from the telecommunications network infrastructure 440 for access to resources on the enterprise infrastructure network 410 based on the security policy defined by the slice network function roster and security policy 172.

As shown in FIG. 4, the enterprise infrastructure network 410 may comprise one or more resources including one or more of, but not limited to, enterprise server(s) 420, enterprise network function(s) 422, enterprise data store(s) 424, enterprise resource(s) 426, and/or one or more enterprise UEs 428. Such resources of the enterprise infrastructure network 410 may function as UE, data servers, sensors, IoT devices, industrial or building equipment (e.g., fans, coolers, motors, lighting systems, security systems, or building infrastructure control systems) that may provide information and/or be controlled in response to communications (e.g., service requests) from the network slice instance 210. In some embodiments, the enterprise infrastructure network 410 may comprise a security manager 418 that implements a security policy that governs actions and resource access with the enterprise infrastructure network 410 based on criteria determined by operators of the enterprise infrastructure network 410. For example, the security manager 418 may include an enterprise network security policy 412 that is implemented on the enterprise infrastructure network 410 by one or more enterprise network security enforcement 414 functions.

In some embodiments, the trust architecture 200 for the telecommunications network infrastructure 440 may extend to enforcing policies (e.g., one or more of the security policies defined by enterprise network security policy 412) for securing resources of, or available through, the enterprise infrastructure network 410.

For example, in some embodiments, the slice network function security manager 170 may communicate with the enterprise security manager 418 and set one or more of the security policies 320, 322, and 324 based on policies provided by enterprise security manager 418. As an example, in some embodiments, slice network functions such as a UPF 136 slice network function and/or NEF 150 slice network function for a network slice instance 210 used by the enterprise infrastructure network 410 may receive a security policy 320 pushed to them by the slice network function security manager 170 that incorporates portions of a security policy communicated from the enterprise security manager 418. As an example, the security policy communicated from the enterprise security manager 418 may indicate that the network slice 210 should prohibit transport of data traffic through the UPF 136 and/or NEF 150 slice network functions originating from the data network 107. As another example, in some embodiments, a local PEP 220 and PDP 222 of a slice network function for RAN 102 may be configured by a security policy 320 that regulates the type of radio access technology (RAT) that may be used by wireless 3GPP UE 110 allowed to connect to the network slice instance 210. As such, undesired attempts to access resources of the enterprise infrastructure network 410 may be deterred prior to those attempts reaching the gateway 161, with multiple enforcement points in place between the requesting subject entity and the target resource to thwart an access attempt.

Figure 5:
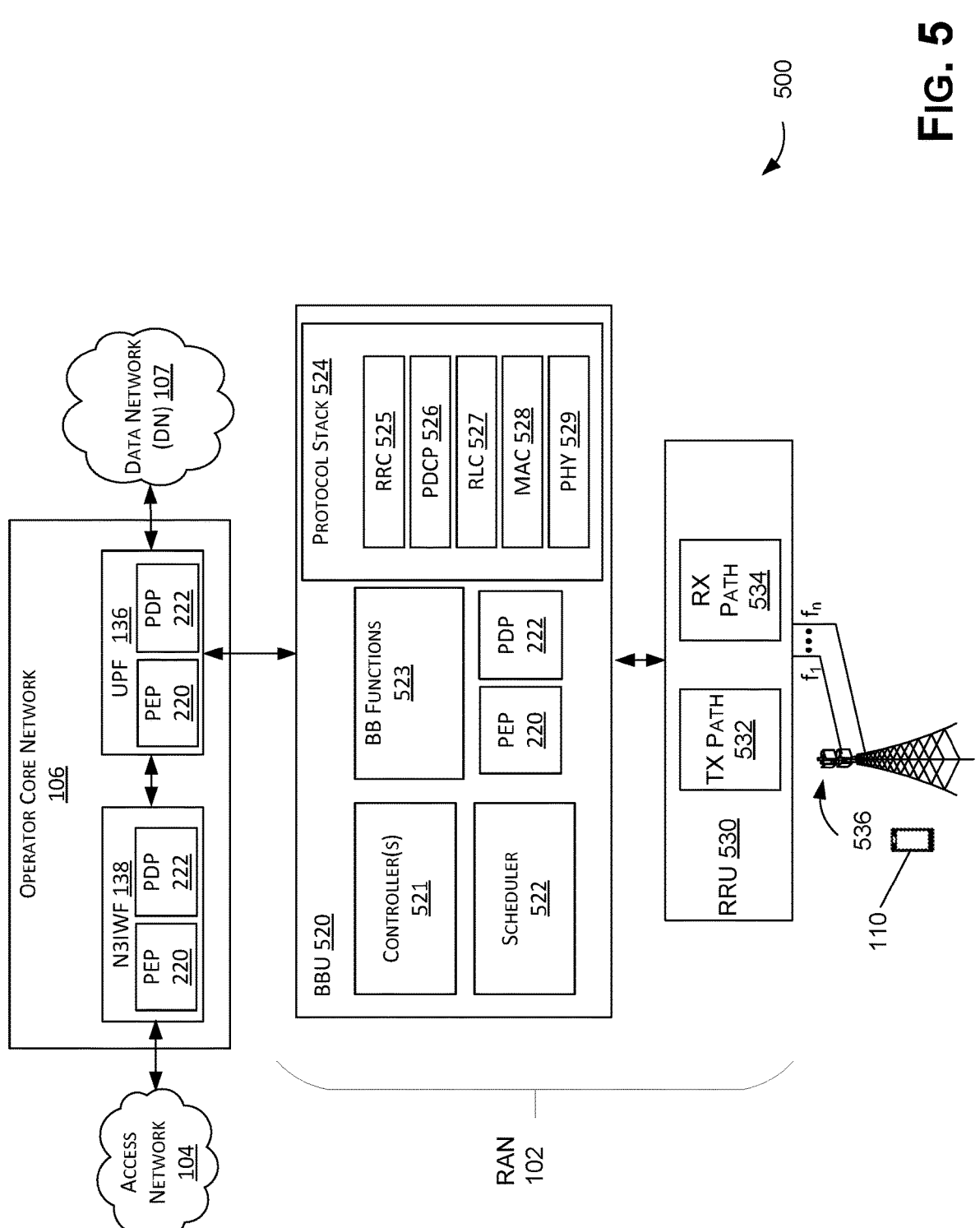
FIG. 5 is a diagram illustrating an example of a segment of a trust architecture for slice network functions of a network slice instance, in accordance with some embodiments described herein.

Referring now to FIG. 5, FIG. 5 is a diagram illustrating an RAN 102 comprising a PEP 220 and PDP 222 to implement the trust architecture for an example implementation of the network slice instance 210. In this example, the RAN 102, N3IWF 138, and UPF 136 are each interconnected slice network functions that represent network slice resources accessible to each other as managed by a respective security policy 320 defined by the network slice function instance slice network function roster and security policy 172. The RAN 102 may comprise a baseband unit (BBU) 520 coupled to at least one Remote Radio Unit (RRU) 530 through which the RAN 102 serves one or more UEs 110 within a coverage area. In some embodiments, the BBU 520 may comprise the Central Unit (CU) of an open-RAN (ORAN) architecture base station. The BBU 520 may comprise the circuity and functionality to implement an air interface and Open System Interconnection (OSI) Layer 1, Layer 2, and Layer 3 functions for the air interface. The RRU 530 includes a radio head comprising transmit (TX) path 532 that includes radio transmitter circuitry (such as digital-to-analog converters, one or more RF filters, frequency upconverters, and/or a Power Amplifier (PA)) and receive path (RX) 234 that includes radio receiver circuitry (such as analog-to-digital converters, one or more RF filters, frequency downconverters, and/or a Low-Noise Amplifier (LNA).). The TX path 532 and RX path 534 may be coupled to one or more antennas 536 by an appropriate coupler (such as a duplexer, for example). In some embodiments, the functions of the BBU 520 and RRU 530 may be distinct components within the RAN 102, or at least partially integrated as a single component. Within the context of 5G NR, the RAN 102 may comprise either a stand-alone (SA) deployment base station, or a non-stand-alone (NSA) deployment base station.

The antennas 536 may be physically mounted to the structure, such as to a wall of a building or a tower. Downlink RF signals are radiated into the coverage area via TX path 532 and antenna(s) 536 for reception by the UE(s) 110. Uplink RF signals transmitted by the UE(s) 110 are received via the antenna(s) 536 and RX path 534. The RAN 102 may communicate with the UE(s) 110 using an air interface that supports Single-Input Single-Output (SISO), or Multiple-Input Multiple-Output (MIMO), Single-Input Multiple-Output (SIMO), Multiple-Input Single-Output (MISO), or other beamforming technologies. In some embodiments, the RAN 102 may optionally support multiple air interfaces and/or multiple wireless operators. In some embodiments, RAN 102 includes support for a plurality of RF band layers, such as at least one designated capacity RF band layer and at least one designated coverage RF band layer.

The BBU 520 is responsible for, among other things, digital baseband signal processing, for example to process uplink and downlink baseband signals, shown in FIG. 5 as Baseband (BB) function(s) 523. The BBU 520 further includes a scheduler 522 through which the BBU 520 allocates resource blocks (RBs) to the UE 110 with respect to both uplink (UL) and downlink (DL) frames. Functions performed by the scheduler 522 include, but are not limited to: Packet Scheduling (arbitration of access to air interface resources between active UEs), resource allocation (allocation of air interface resources, such as resource blocks, to UE), and power allocations (adjusting transmit power to achieve desired data rates and signal-to-interference noise ratio (SINR) levels).

As depicted in FIG. 2, the BBU 520 may comprise one or more controllers 521 comprising a processor coupled to a memory and programmed to perform one or more of the functions of a base station and/or RAN, as described herein. The PEP 220 and PDP 222 are examples of functions of the RAN 102 that may be executed by the one or more controllers 521. In some embodiments, one or more of the base station functions described herein may be executed by one or more controllers in a distributed manner utilizing one or more network functions orchestrated or otherwise configured to execute utilizing processors and memory of the one or more controllers. For example, where RAN 102 comprises a gNodeB, the functions of the BBU 520 may be distributed between functional units comprising a Centralized Unit (CU) and at least one Distributed Unit (DU). As such, one or more functions of the base station described herein may be implemented by discrete physical devices or via virtual network functions. It should also be noted that in some embodiments, elements of the PEP 220 and/or PDP 222 may be implemented at least in part on a node or network server of a communications network (such as one or more edge servers 164, for example) instead of, or in addition to, on board the RAN 102. In some embodiments, the RAN 102 may be implemented on a vehicle designed for space travel (e.g., an Earth-orbiting satellite) for providing a space-based wireless communications base station.

Uplink (UL) and downlink (DL) communications traffic between the BBU 520 and UE 110 are processed through a protocol stack 524 implemented by the BBU 520 that comprises various protocol stack layers. In the example embodiment illustrated in FIG. 5, the protocol stack 524 includes a radio resource control (RRC) layer 525, packet data convergence protocol (PDCP) layer 526, radio link control (RLC) layer 527, medium access control (MAC) layer 528, and physical layer (PHY) 529. The MAC layer 528 is responsible, for example, for mapping between logical channels of the RLC layer 527 and transport channels of the PHY layer 529. MAC layer 528 may also perform functions such as, but not limited to, multiplexing of MAC service data units (SDUs) from logical channels onto transport blocks (TBs) to be delivered to the PHY layer 529 on transport channels, demultiplexing of MAC SDUs from one or different logical channels from transport blocks (TBs) delivered from the PHY layer 529 on transport channels, scheduling information reporting, error correction through hybrid automatic repeat requests (HARQ), priority handling between UEs by means of dynamic scheduling, priority handling between logical channels of one UE, and logical channel prioritization.

In this example, PEP 220 and PDP 222 executed by the BBU 520 regulate access to service resources of the RAN 102 from the UPF 136 instance and/or from a UE 110 per a security policy 320 defined by the slice network function roster and security policy 172. PEP 220 and PDP 222 executed by the N3IWF 138 instance regulate access to service resources of the N3IWF 138 from the UPF 136 instance and/or from access network 104 per a security policy 320 defined by the slice network function roster and security policy 172. PEP 220 and PDP 222 executed by the UPF 136 instance regulate access to service resources of the UPF 136 from the N3IWF 138 instance from the data network 107 and/or from RAN 102 per a security policy 320 defined by the slice network function roster and security policy 172. In this way, the security of slice network function transporting user plane traffic is managed at multiple locations within the network slice instance 210.

FIG. 6 is a flow chart illustrating a method 600 for telecommunication network slice security, according to some embodiments. It should be understood that the features and elements described herein with respect to the method of FIG. 6 may be used in conjunction with, in combination with, or substituted for elements of any of the other embodiments discussed herein and vice versa. Further, it should be understood that the functions, structures, and other descriptions of elements for embodiments described in FIG. 6 may apply to like or similarly named or described elements across any of the figured and/or embodiments described herein and vice versa. In some embodiments, elements of method 600 are implemented utilizing one or more processing units, such as the controller of an operator core network, an edge server, an RAN, a UE, and/or other processing units, as disclosed in any of the embodiments herein. In some embodiments, the method 600 may be implemented by components of a telecommunications network environment 100, such as illustrated by FIG. 1.

The method 600 at B610 includes establishing a network slice instance on a telecommunications network, the network slice instance comprising at least a plurality of slice network functions corresponding to network functions of an operator core network of the telecommunications network. For example, in some embodiments, the method established a network slice instance such as the network slice instance 210 illustrated with respect to FIG. 2 and the network environment 100 of FIG. 1.

In some embodiments, the plurality of slice network functions further correspond to one or more functions of at least one of: a radio access network coupled to the operator core network, a server coupled to a core network edge of the operator core network, a customer premise gateway coupled to the operator core network via an access network, and at least one user equipment (UE) having access to the network slice instance. The plurality of slice protection points may further include at least one of: a resource node (e.g., resource(s) 232) accessible via the at least one network function, and/or a subject node (e.g., subject(s) 230), that transmits the service requests. In some embodiments, the service requests may include at least one service request received at the first slice network function for access to a resource accessible through the first slice network function. In some embodiments, the service request may include at least one service request generated by the first network slice instance for access to a resource accessible through a second slice network function of the network slice instance.

The method 600 at B612 includes establishing a trust architecture for the network slice instance based on a slice security policy defined by a slice trust manager, wherein the slice trust manager defines a plurality of slice protection points, each slice protection point corresponding to a slice network function of the plurality of slice network functions within the network slice instance. In some embodiments, the slice security policy may be configured at least in part based on configuration information received from a security manager of an enterprise infrastructure network coupled to the network slice instance via an access network. The slice trust manager may comprise a roster of slice network functions corresponding to the plurality of protection points, such as is shown with respect to FIG. 3. The roster of slice network functions may identify at least one of authorized interconnects, valid requests, or blocked interconnects for each respective slice network function corresponding to a respective protection point of the plurality of protection points. The method may include accessing one or more records from a ledger to determine at least part of the slice security policy, wherein the ledger comprises at least one of a blockchain ledger technology or a hyperledger technology.

The method 600 at B614 includes executing a local policy decision point and a local policy enforcement point at each slice network function corresponding to a respective slice protection point of the plurality of slice protection points. The method may include determining the local security policy from at least a portion of the slice security policy, and communicating the local security policy from the slice trust manager to the policy decision point.

The method 600 at B616 includes for at least a first slice network function of the plurality of slice network functions, applying the policy enforcement point to regulate service requests based on a local security policy defined by the policy decision point based on the slice security policy. The method may include applying a policy enforcement point corresponding to a first slice network function to regulate granting of the service request based on a local security policy for the first slice network function defined by a policy decision point corresponding to the first slice network function, and generating a response to the service request based at least in part on applying a policy enforcement point. If the service request is granted, the slice network function responds by providing the requestor with access to one or more resources of the slice network function corresponding to the service request. If the service request is not granted, then the policy enforcement point may either ignore the request or return an error message to the network entity that made the service request.

Figure 7:
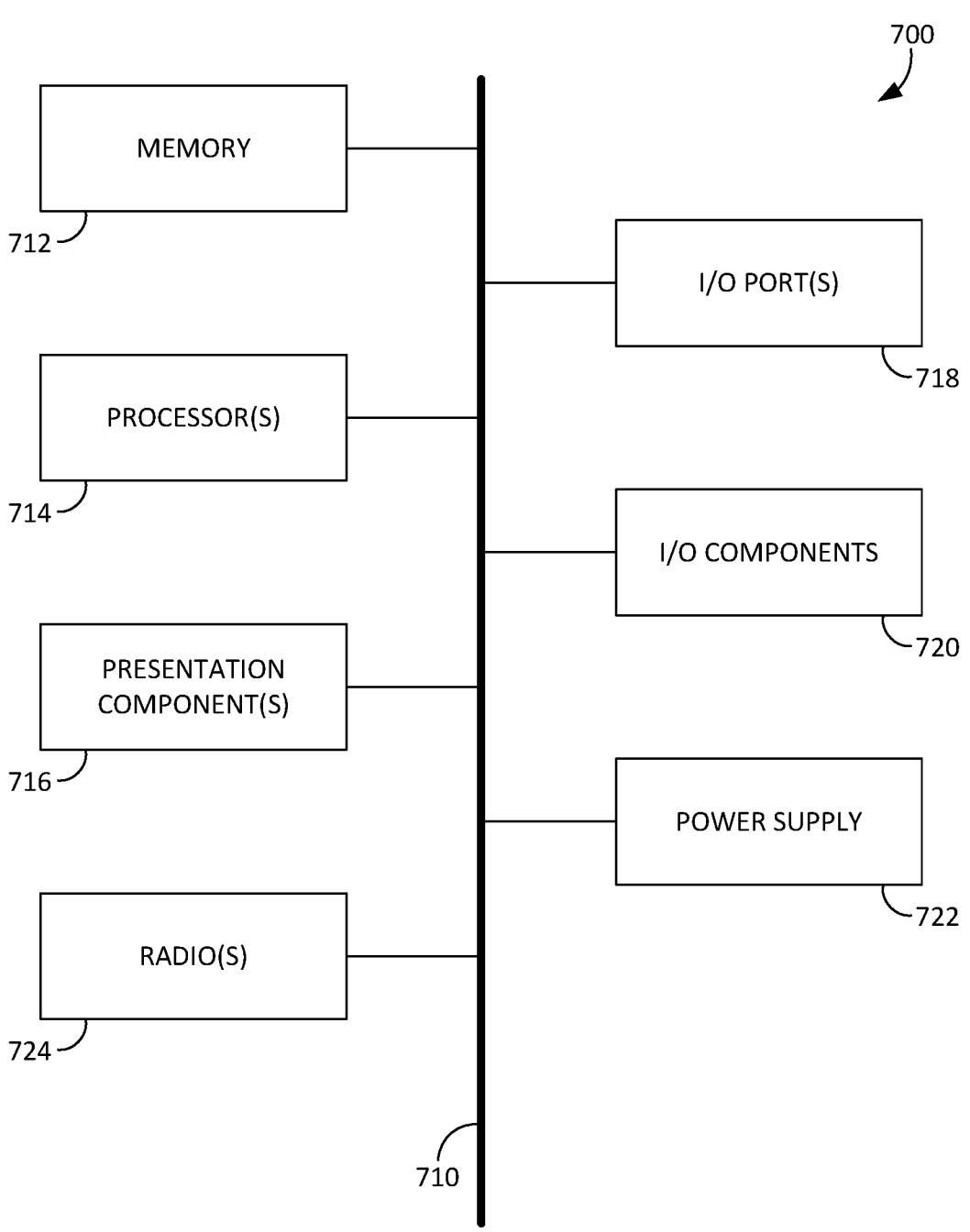
FIG. 7 is an example computing device, in accordance with some embodiments described herein.

Referring to FIG. 7, a diagram is depicted of an exemplary computing environment suitable for use in implementations of the present disclosure. In particular, the exemplary computer environment is shown and designated generally as computing device 700. Computing device 700 is but one example of a suitable computing environment and is not intended to suggest any limitation as to the scope of use or functionality of the embodiments described herein. Neither should computing device 700 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 7, computing device 700 includes bus 710 that directly or indirectly couples the following devices: memory 712, one or more processors 714, one or more presentation components 716, input/output (I/O) ports 718, I/O components 720, power supply 722, and radio 724. Bus 710 represents what may be one or more buses (such as an address bus, data bus, or combination thereof). The devices of FIG. 7 are shown with lines for the sake of clarity. However, it should be understood that the functions performed by one or more components of the computing device 700 may be combined or distributed amongst the various components. For example, a presentation component such as a display device may be one of I/O components 720. In some embodiments, one or more functions of a slice trust manager, policy enforcement point (PEP), and/or protection decision point (PDP) may be executed at least in part by computing device 700. The processors of computing device 700, such as one or more processors 714, have memory. The present disclosure hereof recognizes that such is the nature of the art, and reiterates that FIG. 7 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 7 and refer to "computer" or "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules, or other data.

Computer storage media includes non-transient RAM, ROM, EEPROM, flash memory or other memory technology, CD-ROM, digital versatile disks (DVDs) or other optical disk storage, magnetic cassettes, magnetic tape, magnetic disk storage or other magnetic storage devices. Computer storage media and computer-readable media do not comprise a propagated data signal or signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer-storage media in the form of volatile and/or non-volatile memory. Memory 712 may be removable, non-removable, or a combination thereof. Exemplary memory includes solid-state memory, hard drives, optical-disc drives, etc. Computing device 700 includes one or more processors 714 that read data from various entities such as bus 710, memory 712, or I/O components 720. One or more presentation components 716 presents data indications to a person or other device. Exemplary one or more presentation components 716 include a display device, speaker, printing component, vibrating component, etc. I/O ports 718 allow computing device 700 to be logically coupled to other devices including I/O components 720, some of which may be built into computing device 700. Illustrative I/O components 720 include a microphone, joystick, game pad, satellite dish, scanner, printer, wireless device, etc.

Radio(s) 724 represents a radio that facilitates communication with a wireless telecommunications network. For example, radio(s) 724 may be used to establish communications with components of the RAN 102, access network 104, operator core network 106, and/or core network edge 105. Illustrative wireless telecommunications technologies include CDMA, GPRS, TDMA, GSM, and the like. Radio(s) 724 may additionally or alternatively facilitate other types of wireless communications including Wi-Fi, WiMAX, LTE, and/or other VoIP communications. In some embodiments, radio(s) 724 may support multimodal connections that include a combination of 3GPP radio technologies (e.g., 4G, 5G, and/or 6G) and/or non-3GPP radio technologies. As can be appreciated, in various embodiments, radio(s) 724 can be configured to support multiple technologies and/or multiple radios can be utilized to support multiple technologies. In some embodiments, the radio(s) 724 may support communicating with access network comprising a terrestrial wireless communications base station and/or a space-based access network (e.g., an access network comprising a space-based wireless communications base station). A wireless telecommunications network might include an array of devices, which are not shown so as to not obscure more relevant aspects of the embodiments described herein. Components such as a base station, a communications tower, or even access points (as well as other components) can provide wireless connectivity in some embodiments.

Referring to FIG. 8, a diagram is depicted generally at 800 of an exemplary cloud computing environment 810 for implementing one or more aspects of a trust architecture for telecommunication network slice security, implemented by the systems and methods described herein. Cloud computing environment 810 is but one example of a suitable cloud computing environment and is not intended to suggest any limitation as to the scope of use or functionality of the embodiments presented herein. Neither should cloud computing environment 810 be interpreted as having any dependency or requirement relating to any one or combination of components illustrated. In some embodiments, the cloud computing environment 810 is coupled to a network 805 and executed within operator core network 106, the core network edge 105, edge server 164, or otherwise coupled to the core network edge 105 or operator core network 106.

Cloud computing environment 810 includes one or more controllers 820 comprising one or more processors and memory. The controllers 820 may comprise servers of a data center. In some embodiments, the controllers 820 are programmed to execute code to implement at least one or more aspects of the slice network function security manger 170 and/or slice network function roster and security policy 172 functions, and/or PEP 220 and PDP 222 for one or more slice network functions 840. For example, in one embodiment slice network function roster and security policy 172, one or more of PEP 220 and PDP 222, and/or any of the slice network functions discussed herein may be implemented as one or more virtual network functions (VNFs) 830 (which may include one or more container network functions (CNFs)) running on a worker node cluster 825 established by the controllers 820.

The cluster of worker nodes 825 may include one or more orchestrated Kubernetes (K8s) pods that realize one or more containerized applications 835. In other embodiments, another orchestration system may be used. For example, the worker nodes 825 may use lightweight Kubernetes (K3s) pods, Docker Swarm instances, and/or other orchestration tools. In some embodiments, one or more elements of the network environment 100 may be implemented by, or coupled to, the controllers 820 of the cloud computing environment 810 by operator core network 106 and/or core network edge 105. In some embodiments, slice network function roster and security policy 172 and/or the slice security policy ledger 174 may be implemented at least in part as one or more data store persistent volumes 840 in the cloud computing environment 810.

In various alternative embodiments, system and/or device elements, method steps, or example implementations described throughout this disclosure (such as the UE, access networks, core network edge, operator core network, slice network functions, PEP, PDP, slice trust manager, and/or any of the sub-parts thereof, for example) may be implemented at least in part using one or more computer systems, field-programmable gate arrays (FPGAs), application-specific integrated circuits (ASICs), or similar devices comprising a processor coupled to a memory and executing code to realize that elements, processes, or examples, said code stored on a non-transient hardware data storage device. Therefore, other embodiments of the present disclosure may include elements comprising program instructions resident on computer-readable media that when implemented by such computer systems, enable them to implement the embodiments described herein. As used herein, the term "computer-readable media" refers to tangible memory storage devices having non-transient physical forms. Such non-transient physical forms may include computer memory devices, such as but not limited to: punch cards, magnetic disk or tape, any optical data storage system, flash read-only memory (ROM), non-volatile ROM, programmable ROM (PROM), erasable-programmable ROM (E-PROM), random-access memory (RAM), or any other form of permanent, semi-permanent, or temporary memory storage system of device having a physical, tangible form. Program instructions include, but are not limited to, computer-executable instructions executed by computer system processors and hardware description languages such as Verilog or Very High Speed Integrated Circuit (VHSIC) Hardware Description Language (VHDL).

As used herein, the terms "function," "unit," "server," "node," and "module" are used to describe computer processing components and/or one or more computer-executable services being executed on one or more computer processing components. In the context of this disclosure, such terms used in this manner would be understood by one skilled in the art to refer to specific network elements and not used as nonce word or intended to invoke 35 U.S.C. 112(f).

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings, which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system for telecommunication network slice security, the system comprising:
   one or more processors; and
   one or more tangible computer-readable media storing non-transitory computer-usable instructions that, when executed by the one or more processors, cause the one or more processors to:
   establish a network slice instance on a telecommunications network, the network slice instance comprising at least a plurality of slice network functions corresponding to network functions of an operator core network of the telecommunications network;
   establish a trust architecture for the network slice instance based on a slice security policy defined by a slice trust manager, wherein the slice trust manager defines a plurality of slice protection points, each slice protection point corresponding to a slice network function of the plurality of slice network functions within the network slice instance, wherein the slice trust manager comprises a roster of slice network functions corresponding to the plurality of slice protection points, and wherein the roster of slice network functions identifies at least one of authorized interconnects, valid requests, or blocked interconnects, for each respective slice network function corresponding to a respective protection point of the plurality of slice protection points;
   execute a local policy decision point and a local policy enforcement point at each slice network function corresponding to a respective slice protection point of the plurality of slice protection points; and
   for at least a first slice network function of the plurality of slice network functions, apply the local policy enforcement point to regulate service requests based on a local security policy defined by the local policy decision point based on the slice security policy.

2. The system of claim 1, wherein the plurality of slice network functions further correspond to one or more functions of at least one of: a radio access network coupled to the operator core network, a server coupled to a core network edge of the operator core network, a customer premise gateway coupled to the operator core network via an access network, and at least one user equipment (UE) having access to the network slice instance.

3. The system of claim 1, wherein the plurality of slice protection points further includes at least one of: a resource node accessible via the plurality of slice network functions, and a subject node that transmits the service requests.

4. The system of claim 1, wherein the service requests include at least one service request received at the first slice network function for access to a resource accessible through the first slice network function.

5. The system of claim 1, wherein the service requests include at least one service request generated by the first slice network function for access to a resource accessible through a second slice network function of the network slice instance.

6. The system of claim 1, the one or more processors further to:
   configure the slice security policy at least in part based on configuration information received from a security manager of an enterprise infrastructure network coupled to the network slice instance via an access network.

7. The system of claim 1, the one or more processors further to:

determine the local security policy from at least a portion of the slice security policy; and communicate the local security policy from the slice trust manager to the local policy decision point.

8. The system of claim 1, the one or more processors further to:

access one or more records from a ledger to determine at least part of the slice security policy, wherein the ledger comprises at least one of a blockchain ledger technology or a hyperledger technology.

9. A method for telecommunication network slice security, the method comprising:

receiving a service request at a first slice network function orchestrated for a network slice instance, the network slice instance comprising at least a plurality of slice network functions corresponding to network functions of an operator core network of a telecommunications network;

applying a policy enforcement point integrated within the first slice network function to regulate granting of the service request based on a local security policy for the first slice network function defined by a policy decision point integrated within the first slice network function, wherein a slice trust manager comprises a roster of slice network functions, and wherein the roster of slice network functions identifies at least one of authorized interconnects, valid requests, or blocked interconnects, for at least the first slice network function corresponding to the policy enforcement point and the policy decision point; and generating a response to the service request based at least in part on applying the policy enforcement point.

10. The method of claim 9, the method further comprising:

establishing a trust architecture for the network slice instance based on a slice security policy defined by the slice trust manager, wherein the slice trust manager defines a plurality of slice protection points, each slice protection point corresponding to a slice network function of the plurality of slice network functions within the network slice instance; and regulating service requests using the policy enforcement point based on the local security policy defined by the policy decision point at least in part based on the slice security policy.

11. The method of claim 10, the method further comprising:

updating the local security policy at least in part based on an update to the slice security policy.

12. The method of claim 9, wherein the first slice network function corresponds to a network function of the operator core network of the telecommunications network.

13. The method of claim 9, wherein the first slice network function corresponds to at least one of: a function of a radio access network coupled to the operator core network, a function of a server coupled to a core network edge of the operator core network, a function of a customer premise gateway coupled to the operator core network via an access network, and a function of at least one user equipment (UE) having access to the network slice instance.

14. The method of claim 9, wherein the service request comprises a request received at the first slice network function for access to a resource accessible through the first slice network function.

15. The method of claim 9, wherein the service request comprises at least one service request generated by the first slice network function for access to a resource accessible through a second slice network function of the network slice instance.

16. The method of claim 9, the method further comprising:

configuring the local security policy at least in part based on configuration information received from a security manager of an enterprise infrastructure network coupled to the network slice instance via an access network.

17. A system for telecommunication network slice security, the system comprising:

one or more processors; and one or more tangible computer-readable media storing non-transient computer-usable instructions that, when executed by the one or more processors, cause the one or more processors to:

orchestrate a network slice instance for an operator core network of a telecommunications network, the network slice instance comprising at least a plurality of slice network functions corresponding to network functions of the operator core network;

determine a slice security policy comprising a plurality of slice protection points, each slice protection point corresponding to a slice network function of the plurality of slice network functions within the network slice instance; and within each slice network function corresponding to a slice protection point, execute a local policy enforcement point and a local policy decision point, wherein the local policy enforcement point regulates service requests based on a local security policy defined by the local policy decision point based on the slice security policy, wherein a slice trust manager comprises a roster of slice network functions, and wherein the roster of slice network functions identifies at least one of authorized interconnects, valid requests, or blocked interconnects, for each slice network function corresponding to the network slice instance.

18. The system of claim 17, the one or more processors further to:

establish a data link between the operator core network and an infrastructure network via the network slice instance, wherein the operator core network and the infrastructure network are coupled by a gateway; and determine the slice security policy based at least in part on configuration information received from the infrastructure network.

19. The system of claim 17, the one or more processors further to:

access one or more records from a ledger to determine at least part of the slice security policy, wherein the ledger comprises at least one of a blockchain ledger technology or a hyperledger technology.

* * * * *